(12) United States Patent
Takemoto et al.

(10) Patent No.: US 11,642,621 B2
(45) Date of Patent: May 9, 2023

(54) ACIDIC GAS SEPARATION MEMBRANE SHEET AND MANUFACTURING METHOD THEREFOR

(71) Applicant: SUMITOMO CHEMICAL COMPANY, LIMITED, Tokyo (JP)

(72) Inventors: Hironori Takemoto, Osaka (JP); Kohei Yamamoto, Niihama (JP); Shohei Kasahara, Osaka (JP); Osamu Hirose, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 799 days.

(21) Appl. No.: 16/609,389

(22) PCT Filed: Oct. 29, 2018

(86) PCT No.: PCT/JP2018/040089
§ 371 (c)(1),
(2) Date: Oct. 29, 2019

(87) PCT Pub. No.: WO2019/097994
PCT Pub. Date: May 23, 2019

(65) Prior Publication Data
US 2020/0061530 A1 Feb. 27, 2020

(30) Foreign Application Priority Data
Nov. 15, 2017 (JP) .............................. JP2017-220269

(51) Int. Cl.
*B01D 53/22* (2006.01)
*C08J 7/04* (2020.01)
*B01D 63/10* (2006.01)
*B01D 67/00* (2006.01)
*B01D 69/02* (2006.01)
*B01D 69/12* (2006.01)
*B01D 69/14* (2006.01)
*B01D 71/36* (2006.01)
*B01D 71/40* (2006.01)
*B32B 27/08* (2006.01)
*B32B 27/32* (2006.01)
*B32B 37/20* (2006.01)
*B32B 38/16* (2006.01)
*C08J 5/18* (2006.01)
*B32B 38/00* (2006.01)

(52) U.S. Cl.
CPC ........... *B01D 53/228* (2013.01); *B01D 63/10* (2013.01); *B01D 67/0095* (2013.01); *B01D 69/02* (2013.01); *B01D 69/12* (2013.01); *B01D 69/142* (2013.01); *B01D 71/36* (2013.01); *B01D 71/40* (2013.01); *B32B 27/08* (2013.01); *B32B 27/322* (2013.01); *B32B 37/203* (2013.01); *B32B 38/164* (2013.01); *C08J 5/18* (2013.01); *C08J 7/0427* (2020.01); *B01D 2323/50* (2013.01); *B01D 2325/36* (2013.01); *B01D 2325/38* (2013.01); *B32B 2038/166* (2013.01); *B32B 2250/02* (2013.01); *B32B 2250/24* (2013.01); *B32B 2255/10* (2013.01); *B32B 2255/26* (2013.01); *B32B 2305/026* (2013.01); *B32B 2307/724* (2013.01); *B32B 2307/728* (2013.01); *B32B 2307/73* (2013.01); *B32B 2309/60* (2013.01); *B32B 2327/18* (2013.01); *B32B 2333/04* (2013.01); *C08J 2327/18* (2013.01); *C08J 2333/02* (2013.01)

(58) Field of Classification Search
CPC .. B01D 53/228; B01D 63/10; B01D 67/0095; B01D 69/02; B01D 69/12; B01D 69/142; B01D 71/36; B01D 71/40; C08J 7/0427; C08J 5/18; B32B 27/08; B32B 27/332; B32B 37/203; B32B 38/164
USPC ............................................................ 96/11
See application file for complete search history.

(56) References Cited

U.S. PATENT DOCUMENTS

| | | | |
|---|---|---|---|
| 2010/0117250 A1 | 5/2010 | Ikeda et al. | |
| 2015/0151244 A1 | 6/2015 | Ishizuka | |
| 2015/0165384 A1* | 6/2015 | Aburaya | ................. B01D 53/62 156/278 |
| 2016/0051938 A1 | 2/2016 | Okada et al. | |

(Continued)

FOREIGN PATENT DOCUMENTS

| | | | | |
|---|---|---|---|---|
| CN | 101600958 A | * | 12/2009 | ............. B01D 63/02 |
| CN | 101600958 A | | 12/2009 | |
| CN | 104619402 A | * | 5/2015 | ............. B01D 53/22 |

(Continued)

OTHER PUBLICATIONS

Extended European Search Report issued in corresponding European Patent Application No. 18878204.9-1104, dated Sep. 28, 2020.

(Continued)

*Primary Examiner* — Michael M. Bernshteyn
(74) *Attorney, Agent, or Firm* — McDermott Will & Emery LLP

(57) ABSTRACT

An acidic gas separation membrane sheet causes an acidic gas to selectively permeate therethrough. The acidic gas separation membrane sheet includes a first porous layer, a hydrophilic resin composition layer, and a second porous layer in this order. A second peel strength between the second porous layer and the hydrophilic resin composition layer is less than a first peel strength between the first porous layer and the hydrophilic resin composition layer. An average value of the second peel strength is within a range of greater than or equal to 5 N/m and less than or equal to 500 N/m.

13 Claims, 5 Drawing Sheets

(56) References Cited

U.S. PATENT DOCUMENTS

2017/0232398 A1   8/2017   Ota et al.

FOREIGN PATENT DOCUMENTS

| | | | |
|---|---|---|---|
| CN | 104619402 A | 5/2015 | |
| CN | 106573207 A | 4/2017 | |
| CN | 106839269 A | 6/2017 | |
| EP | 2 979 745 A1 | 2/2016 | |
| EP | 2979745 A1 * | 2/2016 | ........... B01D 53/228 |
| JP | 2009-195900 A | 9/2009 | |
| JP | 2014-065025 A | 4/2014 | |
| JP | 2015-027644 A | 2/2015 | |
| JP | 2015027644 A * | 2/2015 | |
| JP | 2015-112502 A | 6/2015 | |
| JP | 2015112592 A * | 6/2015 | ............. B01D 15/18 |
| JP | 5990555 B2 | 9/2016 | |
| JP | 2019-089034 A | 6/2019 | |
| WO | 2014/157069 A1 | 10/2014 | |

OTHER PUBLICATIONS

European Office Action issued in corresponding European Patent Application No. 18878204.9-1104, dated Oct. 28, 2021.
International Search Report issued in corresponding International Patent Application No. PCT/2018/040089, dated Jan. 29, 2019, with English translation.
Chinese Office Action issued in corresponding Chinese Patent Application No. 201880034595.9, dated Jun. 11, 2021, with English translation.

* cited by examiner

ACIDIC GAS SEPARATION MEMBRANE SHEET AND MANUFACTURING METHOD THEREFOR

CROSS REFERENCE TO RELATED APPLICATIONS

This application is the U.S. National Phase under 35 U.S.C. § 371 of International. Application No. PCT/JP2018/040089 filed on. Oct. 29, 2018, which claims the benefit of Japanese Application No. 2017-220269, filed on Nov. 15, 2017, the entire contents of each are hereby incorporated by reference.

TECHNICAL FIELD

The present invention relates to an acidic gas separation membrane sheet and a manufacturing method therefor.

BACKGROUND ART

Energy saving can be realized as a process of separating an acidic gas such as carbon dioxide from a synthesis gas, a natural gas, and an exhaust gas and the like that are synthesized in a plant that manufactures hydrogen and urea and the like, whereby an acidic gas membrane separation process recently becomes a focus of attention.

In the acidic gas membrane separation process, it has been known to use an acidic gas separation membrane sheet including a gel layer. For example, in Japanese Patent Laying-Open No. 2009-195900 (PTL 1), a gas separation membrane sheet is described, in which a hydrophilic porous membrane supporting a gel layer is sandwiched between two hydrophobic porous membranes.

CITATION LIST

Patent Literature

PLT 1: Japanese Patent Laying-Open No. 2009-195900

SUMMARY OF INVENTION

Technical Problem

An object of the present invention is to provide an acidic gas separation membrane sheet having excellent separation performance and a manufacturing method therefor.

Solution to Problem

The present invention provides an acidic gas separation membrane sheet to be shown below and a manufacturing method therefor and the like.

[1] An acidic gas separation membrane sheet that causes an acidic gas to selectively permeate therethrough,
wherein:
the acidic gas separation membrane sheet includes a first porous layer, a hydrophilic resin composition layer, and a second porous layer in this order;
a second peel strength between the second porous layer and the hydrophilic resin composition layer is less than a first peel strength between the first porous layer and the hydrophilic resin composition layer; and
an average value of the second peel strength is within a range of greater than or equal to 5 N/m and less than or equal to 500 N/m.

[2] The acidic gas separation membrane sheet according to [1], wherein a ratio of a standard deviation of the second peel strength to the average value of the second peel strength (standard deviation/average value) is less than 0.5.

[3] The acidic gas separation membrane sheet according to [1] or [2], wherein a contact angle of water in the second porous layer is greater than or equal to 90 degrees at a temperature of 25° C.

[4] The acidic gas separation membrane sheet according to any one of [1] to [3], wherein the second porous layer contains at least one resin selected from the group consisting of polyethylene, polypropylene, polystyrene, polyethylene terephthalate, a fluorine-containing resin, polyethersulfone, polyphenylene sulfide, polysulfone, polyimide, polyetherimide, and polyetheretherketone.

[5] The acidic gas separation membrane sheet according to any one of [1] to [4], wherein the hydrophilic resin composition layer contains a hydrophilic resin, a substance that reversibly reacts with an acidic gas, and a medium.

[6] An acidic gas separation membrane element including the acidic gas separation membrane sheet according to any one of [1] to [5].

[7] The acidic gas separation membrane element according to [6], further including:
a perforated central tube; and
an element stack body including the acidic gas separation membrane sheet,
wherein the element stack body is wound around the perforated central tube.

[8] A gas separation membrane module including:
at least one acid gas separation membrane element according to [6] or [7];
a source gas supply port for feeding a source gas to the acidic gas separation membrane sheet;
a retentate gas discharge port for discharging a source gas that does not permeate through the acidic gas separation membrane sheet; and
a permeate gas discharge port for discharging an acidic gas that has permeated through the acidic gas separation membrane sheet.

[9] A method for manufacturing the acidic gas separation membrane sheet according to any one of [1] to [5], the method including the steps of:
preparing a hydrophilic resin composition liquid for forming the hydrophilic resin composition layer;
applying the hydrophilic resin composition liquid onto the first porous layer to form a liquid layer;
drying the liquid layer to form an applied layer on the first porous layer; and
laminating the second porous layer on the applied layer to form a laminate body,
wherein the hydrophilic resin composition liquid contains a hydrophilic resin and a medium.

[10] The method according to [9], wherein the hydrophilic resin composition liquid further contains a substance that reversibly reacts with an acidic gas.

[11] The method according to [9] or [10], further including the step of drying the applied layer in the laminate body following the step of forming the laminate body.

[12] The method according to any one of [9] to [11], wherein an environmental humidity in the step of forming the laminate body is within a range of greater than or equal to 40% RH and less than or equal to 85% RH.

[13] The method according to any one of [9] to [12], further including the step of confirming an abnormality of the liquid layer between the step of forming the liquid layer and the step of forming the applied layer.

[14] The method according to [13], wherein the step of confirming the abnormality includes the steps of:

imaging the liquid layer; and detecting art abnormality included in at least one of a surface of the liquid layer and an inside of the liquid layer using an image obtained in the imaging step.

[15] The method according to [14], further including the step of providing a mark on at least one of the first porous layer and the second porous layer so as to make it possible to recognize a region including the liquid layer in which the abnormality is detected.

[16] The method according to [15], further including the step of removing the region based on the mark provided in the step of providing the mark.

[17] A method for manufacturing an acidic gas separation membrane element including an acidic gas separation membrane sheet, wherein the acidic gas separation membrane sheet is manufactured by the method for manufacturing an acidic gas separation membrane sheet according to [16].

Advantageous Effect of Invention

Since an acidic gas separation membrane sheet of the present invention has excellent separation performance, the use of the acidic gas separation membrane sheet of the present invention makes it possible to manufacture an acidic gas separation membrane element and a separation membrane module having good separation performance.

DESCRIPTION OF EMBODIMENTS

Hereinafter, embodiments of the present invention will be described with reference to the drawings.

(Acidic Gas Separation Membrane Sheet)

Figure 1:
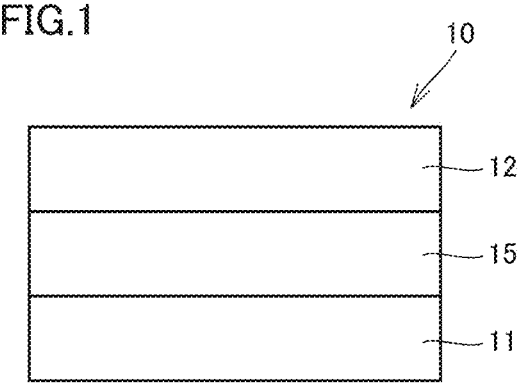
FIG. 1 is a cross-sectional view showing an example of an acidic gas separation membrane sheet of the present invention.

FIG. 1 is a cross-sectional view showing an example of an acidic gas separation membrane sheet of the present invention. As shown in FIG. 1, an acidic gas separation membrane sheet 10 causes an acidic gas to selectively permeate therethrough. Acidic gas separation membrane sheet 10 includes a first porous layer 11, a hydrophilic resin composition layer 15, and a second porous layer 12 in this order. A second peel strength between second porous layer 12 and hydrophilic resin composition layer 15 is less than a first peel strength between first porous layer 11 and hydrophilic resin composition layer 15. An average value of the second peel strength is within a range of greater than or equal to 5 N/m and less than or equal to 500 N/m.

The average value of the second peel strength between second porous layer 12 and hydrophilic resin composition layer 15 is greater than or equal to 5 N/m, preferably greater than or equal to 10 N/m, more preferably greater than or equal to 25 N/m or more, and usually less than or equal to 500 N/m. When the second peel strength is within the above range, as described later, hydrophilic resin composition layer 15 and second porous layer 12 are bonded with a sufficient adhesive strength, whereby, even when acidic gas separation membrane sheet 10 is rolled in a roll or processed into a spiral-wound type gas separation membrane element, acidic gas separation membrane sheet 10 can have good separation performance in a gas membrane separation process.

The average value of the second peel strength is a value calculated from the time-lapse data of a peel strength obtained by a peel tester. Specifically, the average value of the second peel strength is a value obtained by leaving a 25 mm×100 mm sample for measurement that has been cut out of acidic gas separation membrane sheet 10 in an environment of a temperature of 25° C. and a humidity of 50% RH for at least 2 hours, then attaching the sample to the peel tester, and averaging the value of the peel strength for 5 seconds to 15 seconds after the start of the measurement for the time-lapse data of the peel strength measured under the condition of a peel angle of 180 degrees and a peel speed of 300 mm/min.

The ratio of the standard deviation of the second peel strength between second porous layer 12 and hydrophilic resin composition layer 15 in acidic gas separation membrane sheet 10 to the average value of the second peel strength (standard deviation/average value) is preferably less than 0.5.

The ratio of the second peel strength (standard deviation/average value) is preferably less than 0.5, more preferably less than or equal to 0.2, still more preferably less than or equal to 0.1, and usually greater than 0. A smaller ratio of the second peel strength (standard deviation/average value) indicates that hydrophilic resin composition layer 15 and second porous layer 12 are wholly bonded with a uniform adhesive strength. A greater ratio of the second peel strength (standard deviation/average value) indicates that an adhesion failure portion is present between hydrophilic resin composition layer 15 and second porous layer 12, and the adhesive strength between hydrophilic resin composition layer 15 and second porous layer 12 is not uniform. When the ratio of the second peel strength (standard deviation/average value) is within the above range, the adhesion failure portion between hydrophilic resin composition layer 15 and second porous layer 12 is suppressed as described later. Therefore, even When acidic gas separation membrane sheet 10 is rolled in a roll or processed into a spiral-wound type gas separation membrane element, acidic gas separation membrane sheet 10 can have good separation performance in the gas membrane separation process.

The ratio of the standard deviation of the second peel strength to the average value of the second peel strength (standard deviation/average value) is obtained by leaving a 25 mm×100 mm sample for measurement that has been cut out of acidic gas separation membrane sheet 10 in an environment of a temperature of 25° C. and a humidity of 50% RH for at least 2 hours, then attaching the sample to the peel tester, and determining a ratio of the standard deviation of the peel strength (standard deviation/average value) for 5 seconds to 15 seconds after the start of the measurement to the above average value for the time-lapse data of the peel strength measured under the condition of a peel angle of 180 degrees and a peel speed of 300 mm/min.

Acidic gas separation membrane sheet 10 may be processed into a so-called spiral shape, and used for the gas separation membrane element. Acidic gas separation membrane sheet 10 may be rolled in a roll in the manufacturing step. Acidic gas separation membrane sheet 10 rolled in the roll may be unrolled to be processed into flat membrane type, pleated type, and plate-and-frame type gas separation membrane elements and the like in addition to the spiral-wound type gas separation membrane element. Acidic gas separation membrane sheet 10 of the present embodiment can have good separation performance in the gas membrane separation process even when the acidic gas separation membrane sheet is rolled in a roll or processed into a spiral-wound type gas separation membrane element.

Figure 6:
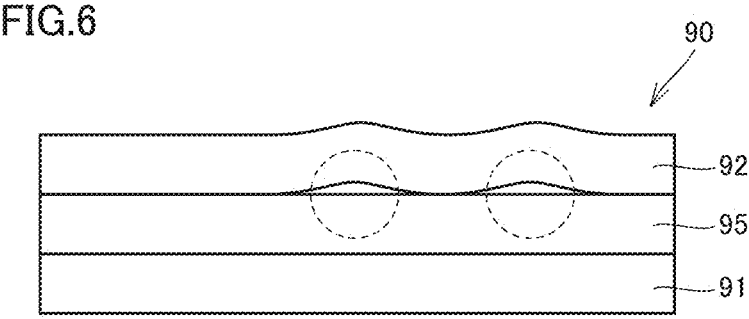
FIG. 6 is a cross-sectional view showing an example of an acidic gas separation membrane sheet having an insufficient adhesion strength and having an adhesion failure portion.

Meanwhile, when an acidic gas separation membrane sheet 90 having a second peel strength of less than 5 N/m and the above ratio of the second peel strength (standard deviation/average value) of greater than or equal to 0.5 is used in the gas membrane separation process, an acidic gas separation membrane sheet having poor separation performance may be present. The cause is as follows:
(1) in acidic gas separation membrane sheet 90 having poor separation performance, wrinkles occur in a second porous layer 92;
(ii) the wrinkles are observed when second porous layer 92 and a hydrophilic resin composition layer 95 are not bonded with a sufficient adhesive strength, and hydrophilic resin composition layer 95 and second porous layer 92 are not wholly bonded uniformly due to bubble marks occurring in the surface of hydrophilic resin composition layer 95 on which second porous layer 92 is laminated, and holes remaining in the inside of the hydrophilic resin composition layer 95, and the like, which causes a partial adhesion failure as in a portion surrounded by a broken line in FIG. 6;
(iii) in acidic gas separation membrane sheet 90 having an insufficient adhesive strength between second porous layer 92 and hydrophilic resin composition layer 95, the wrinkles are apt to occur in second porous layer 92 due to a friction load between the sheets by winding and the like occurring when the acidic gas separation membrane sheet is rolled in a roll or processed into a spiral-wound type gas separation membrane element;
(iv) in acidic gas separation membrane sheet 90 having an adhesion failure portion, slippage occurs between hydrophilic resin composition layer 95 and second porous layer 92 in the adhesion failure portion due to a friction load and the like between the sheets due to winding and the like occurring when rolled in a roll, or processed into a spiral-wound type gas separation membrane element, which is apt to cause wrinkles to occur in second porous layer 92; and
(v) it is considered that the wrinkles occurring in the above (iii) and (iv) cause dents and holes to occur in hydrophilic resin composition layer 95, as a result of which good separation performance cannot be obtained in the gas membrane separation process.

Therefore, it is considered that, since acidic gas separation membrane sheet 90 has an insufficient adhesive strength between second porous layer 92 and hydrophilic resin composition layer 95, the average value of the second peel strength is less than 5 N/m, and acidic gas separation membrane sheet 90 has the adhesion failure portion, whereby the ratio of the second peel strength (standard deviation/average value) is greater than or equal to 0.5.

Meanwhile, it is considered that acidic gas separation membrane sheet 10 shown in FIG. 1 has the average value of a second peel strength of greater than or equal to 5 N/m, and the ratio of the second peel strength (standard deviation/average value) of less than 0.5, whereby hydrophilic resin composition layer 15 and second porous layer 12 are wholly bonded uniformly, which suppresses the occurrence of the adhesion failure portion.

Hereinafter, acidic gas separation membrane sheet 10 will be described in detail.

Acidic gas separation membrane sheet 10 is provided in a gas separation membrane element to be described later for separating an acidic gas from a source gas, and has acidic gas selective permeability that causes the acidic gas contained in the source gas to selectively permeate therethrough. The acidic gas means carbon dioxide ($CO_2$), hydrogen sulfide ($H_2S$), carbonyl sulfide, sulfur oxide ($SO_x$), nitrogen oxide ($NO_x$), or hydrogen halide such as hydrogen chloride. The source gas means a gas fed to the gas separation membrane element, and the source gas contains at least an acidic gas.

In acidic gas separation membrane sheet 10, the high selective permeability of the acidic gas can be realized by a solution/diffusion mechanism and a facilitated transport mechanism. The solution/diffusion mechanism is a mechanism that separates an acidic gas utilizing a difference between solubilities of gas components contained in a source gas in a membrane material and a difference between diffusivities of the gas components contained in the source gas in a membrane. The facilitated transport mechanism is a mechanism in which an acidic gas contained in a source gas and a substance that reversibly reacts with an acidic gas contained in a membrane material (hereinafter, may be referred to as "acidic gas carrier") form a reaction product to promote the permeation of the acidic gas.

The following reaction formula (1) represents a reaction of $CO_2$ and a $CO_2$ carrier when the acidic gas is $CO_2$ and cesium carbonate ($Cs_2CO_3$) is used as the acidic gas carrier ($CO_2$ carrier). The symbol "↔" in the reaction formula (1) indicates that this reaction is a reversible reaction.

$$CO_2+Cs_2CO_3+H_2O \leftrightarrow 2CsHCO_3 \qquad (1)$$

As shown by the above reaction formula (1), water is necessary for the reversible reaction of $CO_2$ and the $CO_2$ carrier. That is, in acidic gas separation membrane 10 in which the acidic gas is $CO_2$, as shown by the above reaction formula (1), water in the membrane material causes the amount of permeation of the acidic gas to change. As the amount of the water in the membrane material is more, the amount of permeation of the acidic gas is more.

(Hydrophilic Resin Composition Layer)

Hydrophilic resin composition layer 15 has gas selective permeability that causes an acidic gas to selectively permeate therethrough in acidic gas separation membrane sheet 10. Hydrophilic resin composition layer 15 is a gel-like layer, and contains at least a hydrophilic resin and a substance that reversibly reacts with an acidic gas (acidic gas carrier). Hydrophilic resin composition layer 15 may contain an additive other than the hydrophilic resin and the acidic gas carrier, as necessary. The thickness of hydrophilic resin composition layer 15 may be appropriately selected depending on separation performance required for acidic gas separation membrane sheet 10. Usually, it is preferably within a range of 0.1 μm to 600 μm, more preferably within a range of 0.5 μm to 400 μm, and particularly preferably within a range of 1 μm to 200 μm.

As shown in the reaction formula (1), in acidic gas separation membrane sheet 10, water is required for a reversible reaction of the acidic gas and the acidic gas carrier. Therefore, acidic gas separation membrane sheet 10 preferably includes a gel-like hydrophilic resin composition layer containing a hydrophilic resin having a hydrophilic group such as a hydroxyl group or an ion exchange group. It is more preferable that the hydrophilic resin contains a crosslinking-type hydrophilic resin in which molecular chains are crosslinked to form a network structure, exhibiting high water-holding properties. Since a pressure difference is applied to acidic gas separation membrane sheet 10 as a forward push for the permeation of an acidic gas through acidic gas separation membrane sheet 10, it is preferable to use a hydrophilic resin containing a crosslinking-type hydrophilic resin also from the viewpoint of a pressure resistance strength required for acidic gas separation membrane sheet 10.

It is preferable that the polymer forming the hydrophilic resin preferably has, for example, a structural unit derived from an alkyl acrylate, an alkyl methacrylate, a vinyl ester of a fatty acid, or a derivative thereof. Examples of such polymers having hydrophilicity include polymers obtained by polymerizing monomers such as acrylic acid, itaconic acid, crotonic acid, methacrylic acid, and vinyl acetate. Specific examples thereof include resins having a carboxyl group as an ion exchange group, such as a polyacrylic acid resin, a polyitaconic acid resin, a polycrotonic acid resin, and a polymethacrylic acid resin; a polyvinyl alcohol resin having a hydroxy group; and copolymers thereof such as an acrylic acid-vinyl alcohol copolymer resin, an acrylic acid-methacrylic acid copolymer resin, an acrylic acid-methyl methacrylate copolymer resin, and a methacrylic acid-methyl methacrylate copolymer resin. Among them, a polyacrylic acid resin that is a polymer of acrylic acid, a polymethacrylic acid resin that is a polymer of methacrylic acid, a polyvinyl alcohol resin obtained by hydrolyzing a polymer of vinyl acetate, an acrylate-vinyl alcohol copolymer resin obtained by saponifying a copolymer of methyl acrylate and vinyl acetate, and an acrylic acid-methacrylic acid copolymer resin that is a copolymer of acrylic acid and methacrylic acid are more preferable, and polyacrylic acid and an acrylate-vinyl alcohol copolymer resin are still more preferable.

The crosslinking-type hydrophilic resin may be prepared by causing a polymer exhibiting hydrophilicity to react with a crosslinking agent, or may also be prepared by copolymerizing a monomer that serves as the raw material of the polymer exhibiting hydrophilicity with a crosslinkable monomer. The crosslinking agent or the crosslinkable monomer is not particularly limited, and a conventionally known crosslinking agent or crosslinkable monomer can be used.

Examples of the crosslinking agent include conventionally known crosslinking agents such as an epoxy crosslinking agent, polyvalent glycidyl ether, a polyhydric alcohol, a polyvalent isocyanate, a polyvalent aziridine, a haloepoxy compound, a polyvalent aldehyde, a polyvalent amine, an organometallic crosslinking agent, and a metallic crosslinking agent. Examples of the crosslinkable monomer include conventionally known crosslinkable monomers such as divinylbenzene, N,N'-methylenebisacrylamide, trimethylolpropane triallylether, and pentaerythritol tetraallylether. As a crosslinking method, it is possible to use conventionally known techniques such as thermal crosslinking, ultraviolet crosslinking, electron beam crosslinking, radiation crosslinking, and photo-crosslinkin gas well as methods described in Japanese Patent Laying-Open Nos. 2003-268009 and 07-88171.

The substance that reversibly reacts with an acidic gas (acidic gas carrier) is present in hydrophilic resin composition layer 15 containing the hydrophilic resin, and reversibly reacts with the acidic gas dissolved in water present in hydrophilic resin composition layer 15, whereby the acidic gas carrier causes the acidic gas to selectively permeate through hydrophilic resin composition layer 15. Hydrophilic resin composition layer 15 contains, as the acidic gas carrier, at least one compound that reversibly reacts with the acidic gas. Specific examples of the acidic gas carrier include, in the case where the acidic gas is carbon dioxide, alkali metal carbonates, alkali metal bicarbonates, alkanolamine (for example, described in Japanese Patent No. 2086581 and the like), and alkali metal hydroxides (for example, described in WO 2016/024523 and the like); in the case where the acidic gas is sulfur oxide, sulfur-containing compounds, citrates of alkali metals, and transition metal complexes (for example, described in Japanese Patent No. 2879057 and the like); and in the case where the acidic gas is nitrogen oxide, alkali metal nitrites and transition metal complexes (for example, described in Japanese Patent No. 2879057 and the like).

Hydrophilic resin composition layer 15 may also contain, for example, a hydration reaction catalyst for the acidic gas, and a surfactant to be described later, and the like as an additive in addition to the hydrophilic resin and the acidic gas carrier. The hydration reaction catalyst for the acidic gas can improve the reaction rate of the acidic gas and the acidic gas carrier. The hydration reaction catalyst for the acidic gas preferably contains an oxo acid compound, more preferably contains at least one elemental oxo acid compound selected from the group consisting of group 14 elements, group 15 elements, and group 16 elements, and still more preferably contains at least one selected from the group consisting of a tellurious acid compound, a selenious acid compound, an arsenious acid compound, and an orthosilicic acid compound.

(First Porous Layer and Second Porous Layer)

First porous layer 11 may be a layer to which the hydrophilic resin composition liquid for forming hydrophilic resin composition layer 15 is applied, as described later. First porous layer 11 has a porosity having high gas permeability so as not to cause the diffusion resistance of the source gas fed to hydrophilic resin composition layer 15, particularly the gas component that is contained in the source gas and selectively permeates through hydrophilic resin composition layer 15 in acidic gas separation membrane sheet 10. First porous layer 11 may have a single-layer structure or a laminated structure including two more layers. It is preferable that first porous layer 11 has heat resistance depending on process conditions in which application of acidic gas separation membrane sheet 10 is assumed. Herein, the term "heat resistance" means that no curl occurs which can be visually confirmed due to heat shrinkage or heat melting even after the member such as first porous layer 11 is stored for 2 hours under the temperature conditions greater than or equal to the process condition, so that the form of the member before preservation is maintained.

Second porous layer 12 may be a layer laminated on the exposed surface of hydrophilic resin composition layer 15 formed on first porous layer 11 as described later. Second porous layer 12 has a porosity having high gas permeability so as not to cause the diffusion resistance of the source gas fed to hydrophilic resin composition layer 15, particularly the gas component that is contained in the source gas and selectively permeates through hydrophilic resin composition layer 15 in acidic gas separation membrane sheet 10. Second porous layer 12 may have a single-layer structure or a laminated structure including two more layers. It is preferable that second porous layer 12 has heat resistance depending on process conditions in a plant in which application of acidic gas separation membrane sheet 10 is assumed.

First porous layer 11 may be hydrophobic, and the contact angle of water at a temperature of 25° C. may be greater than or equal to 90 degrees, greater than or equal to 95 degrees, or greater than or equal to 100 degrees. Second porous layer 12 is preferably hydrophobic. Specifically, in second porous layer 12, the contact angle of water at a temperature of 25° C. is preferably greater than or equal to 90 degrees, more preferably greater than or equal to 95 degrees, and still more preferably greater than or equal to 100 degrees. When a source gas containing moisture is fed to acidic gas separation membrane sheet 10, acidic gas separation membrane sheet 10 may be condensed, and water generated by the condensation may damage hydrophilic resin composition layer 15. However, first porous layer 11 and second porous layer 12 are hydrophobic, whereby the water generated by the condensation penetrates into hydrophilic resin composition layer 15, which can provide suppressed damage to hydrophilic resin composition layer 15. The contact angle of water can be measured with a contact angle meter (for example, manufactured by Kyowa Interface Science Co., Ltd.; trade name: "DropMaster 500").

First porous layer 11 may be a layer to which a hydrophilic resin composition liquid for forming hydrophilic resin composition layer 15 is applied, as described later. This case includes a state where a part of resulting hydrophilic resin composition layer 15 penetrates into the pores of first porous layer 11. Meanwhile, second porous layer 12 may be a layer laminated on an applied layer, as described later. In this case, the degree of penetration of hydrophilic resin composition layer 15 into the pores of second porous layer 12 is less than that of first porous layer 11. Thus, when first porous layer 11 is a layer to which the hydrophilic resin composition liquid is applied, and second porous layer 12 is a layer to be laminated on the applied layer, the second peel strength between second porous layer 12 and hydrophilic resin composition layer 15 is less than the first peel strength between first porous layer 11 and hydrophilic resin composition layer 15 in acidic gas separation membrane sheet 10.

The magnitude relationship between the first peel strength and the second peel strength can be confirmed by the measurement of the second peel strength described above. Specifically, when second porous layer 12 of acidic gas separation membrane sheet 10 is peeled off under a predetermined condition using a peel tester, and hydrophilic resin composition layer 15 is present on the surface on the side of first porous layer 11, the second peel strength can be said to be less than the first peel strength. When hydrophilic resin composition layer 15 is present on the surface on the side of second porous layer 12, the second peel strength can be said to be greater than the first peel strength.

Each of first porous layer 11 and second porous layer 12 preferably contains a resin material. Examples of the resin material contained in first porous layer 11 and second porous layer 12 include polyolefin resins such as polyethylene (PE) and polypropylene (PP); fluorine-containing resins such as polytetrafluoroethylene (PTFE), polyvinyl fluoride (PVF), and polyvinylidene fluoride (PVDF); polyester resins such as polystyrene (PS), polyethylene terephthalate (PET), and polyethylene naphthalate; and resin materials such as polyethersulfone (PES), polyphenylene sulfide (PPS), polysulfone (PSF), polyimide (PI), polyetherimide (PET), polyetheretherketone (PEEK), high-molecular-weight polyesters, heat-resistant polyamides, aramids, and polycarbonates. Among these, in views of water repellency and heat resistance, polypropylene (PP) or a fluorine-containing resin is preferable, and polypropylene (PP) or polytetrafluoroethylene (PTFE) is more preferable. The resin material forming first porous layer 11 and the resin material forming second porous layer 12 may be the same material or different materials.

The thickness of first porous layer 11 and the thickness of second porous layer 12 are not particularly limited, and from the viewpoint of a mechanical strength, usually, the thickness is preferably within a range of 10 µm to 3000 µm, more preferably within a range of 10 µm to 500 µm, and still more preferably within a range of 15 µm to 150 µm. The thickness of first porous layer 11 and the thickness of second porous layer 12 may be the same as or different from each other. The porosity of first porous layer 11 and the porosity of second porous layer 12 are preferably within a range of 5% to 99%, and more preferably within a range of 30% to 90%. The porosity of first porous layer 11 and the porosity of second porous layer 12 may be the same as or different from each other.

In acidic gas separation membrane sheet 10, a porous body may be further laminated on surfaces of first porous layer 11 and second porous layer 12 not in contact with hydrophilic resin composition layer 15 for the purpose of additionally imparting a strength to first porous layer 11 and second porous layer 12. As the porous body, in addition to the resin materials exemplified in first porous layer 11 and second porous layer 12, inorganic materials such as metals, glasses, and ceramics, and nonwoven fabrics or woven fabrics containing these materials, and the like can be suitably used.

(Method for Manufacturing Acidic Gas Separation Membrane Sheet)

Figure 2:
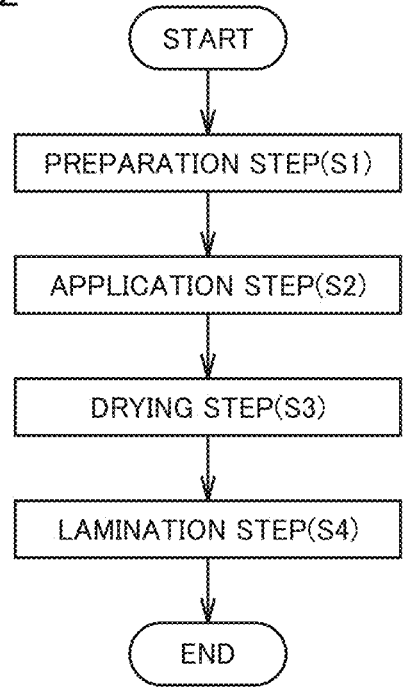
FIG. 2 is a flow chart showing an example of a method for manufacturing an acidic gas separation membrane sheet of the present invention.
Figure 3:
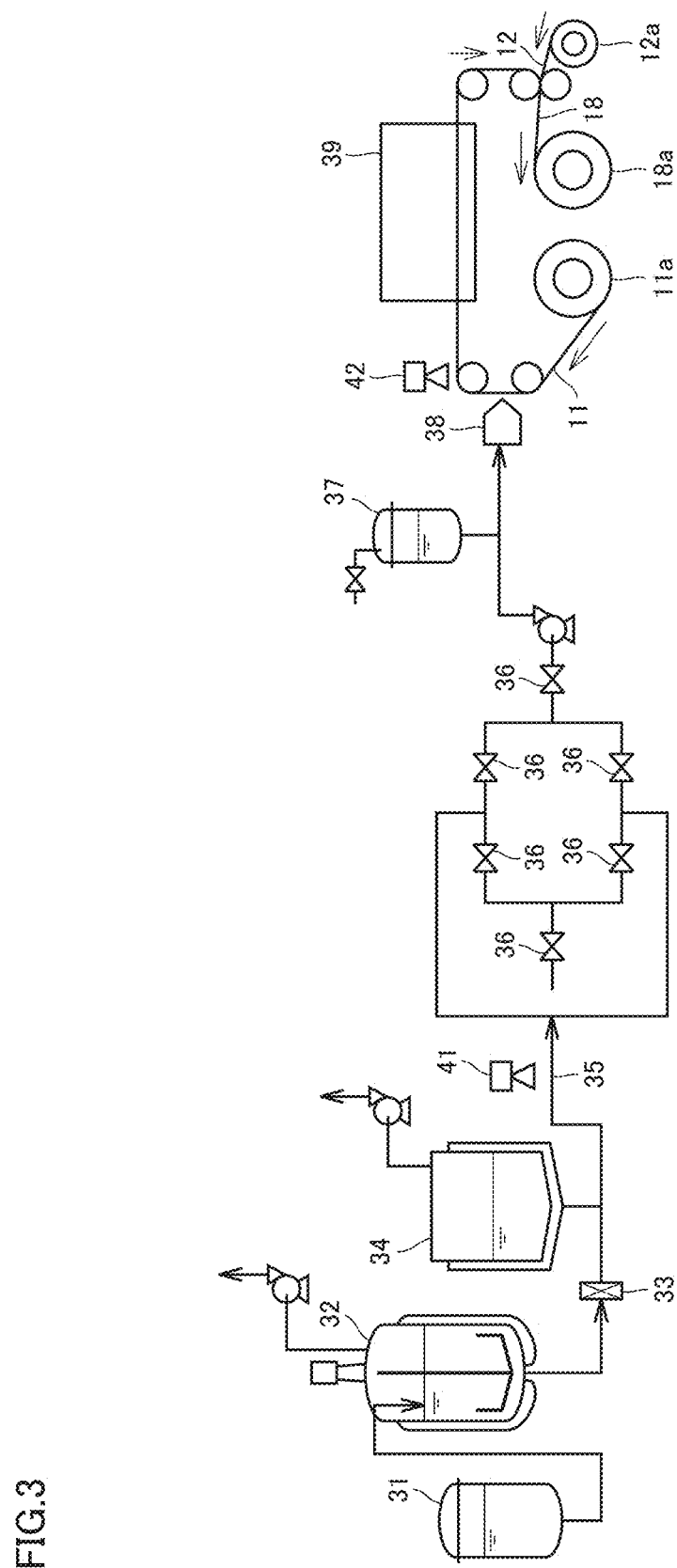
FIG. 3 is a schematic view showing an example of a manufacturing device for manufacturing an acidic gas separation membrane sheet of the present invention.

Hereinafter, an example of a method for manufacturing an acidic gas separation membrane sheet 10 will be described with reference to the drawings. FIG. 2 is a flow chart showing an example of a method for manufacturing an acidic gas separation membrane sheet of the present invention. FIG. 3 is a schematic view of a manufacturing device for manufacturing acidic gas separation membrane sheet 10. The method for manufacturing acidic gas separation membrane sheet 10 includes, as shown in FIG. 2, the steps of:

preparing a hydrophilic resin composition liquid for forming a hydrophilic resin composition layer 15 (hereinafter, referred to as "preparation step (S1)");

applying the hydrophilic resin composition liquid onto a first porous layer 11 to form a liquid layer (hereinafter, referred to as "application step (S2)");

drying the liquid layer to form an applied layer on the first porous layer 11 (hereinafter, referred to as "drying step (S3)"); and laminating a second porous layer 12 on the applied layer to form a laminate body 18 (hereinafter, referred to as "lamination step (S4)"), wherein the hydrophilic resin composition liquid contains a hydrophilic resin and a medium. The hydrophilic resin composition liquid may further contain a substance that reversibly reacts with an acidic gas.

The method for manufacturing acidic gas separation membrane sheet 10 preferably further includes the step of drying the applied layer in laminate body 18 (hereinafter, referred to as "additional drying step") following lamination step (S4). Between application step (S2) and drying step (S3), the step of confirming the abnormality of the liquid layer (hereinafter, referred to as "inspection step") may be included. The method may include the step of removing a region including the liquid layer in which the abnormality is detected in the inspection step (hereinafter, referred to as "removal step").

As shown in FIG. 3, acidic gas separation membrane sheet 10 is preferably manufactured in a so-called roll-to-roll method in which a first porous layer 11 is unrolled from a first porous layer rolled body 11a rolled in a roll; a second porous layer 12 is unrolled from a second porous layer rolled body 12a rolled in a roll; a laminate body 18 is obtained while the layers are continuously conveyed; and laminate body 18 is rolled in a roll.

(Preparation Step (S1))

Preparation step (S1) is the step of preparing a hydrophilic resin composition liquid for forming hydrophilic resin composition layer 15. The hydrophilic resin composition liquid may contain a hydrophilic resin and a medium, and may contain a substance that reversibly reacts with an acidic gas (acidic gas carrier). In preparation step (S1), for example, raw materials (hydrophilic resin and medium and the like) for obtaining the hydrophilic resin composition liquid are mixed at a temperature at which the raw material composition does not change, for example, normal temperature (usually, 20° C.), whereby the hydrophilic resin composition liquid can be prepared. The hydrophilic resin composition liquid is an application liquid for applying the hydrophilic resin composition liquid onto first porous layer 11 to form hydrophilic resin composition layer 15. The hydrophilic resin composition liquid obtained in preparation step (S1) can be stored in a raw material tank 31, as shown in FIG. 3. Raw material tank 31 shown in FIG. 3 may be omitted, and raw materials may be charged into a stirring tank 32, and mixed to prepare the hydrophilic resin composition liquid.

As the hydrophilic resin and the acidic gas carrier, those described above can be used. Examples of the medium include protic polar solvents such as water, and alcohols (such as methanol, ethanol, 1-propanol, and 2-propanol); nonpolar solvents such as toluene, xylene, and hexane; and aprotic polar solvents such as ketones (such as acetone, methyl ethyl ketone, and methyl isobutyl ketone), N-methylpyrrolidone, N,N-dimethylacetamide, and N,N-dimethylformamide. A single kind of medium may be used alone, or greater than or equal to two kinds of media may be used in combination as long as they are compatible with each other. Among these, a medium containing at least one selected from the group consisting of water and alcohols (such as methanol, ethanol, 1-propanol, and 2-propanol) is preferable, and a medium containing water is more preferable.

A surfactant may be added to the hydrophilic resin composition liquid as necessary. By adding the surfactant to the hydrophilic resin composition liquid, the surfactant is unevenly distributed at the interface between hydrophilic resin composition layer 15 and each of first porous layer 11 and second porous layer 12 when the hydrophilic resin composition liquid is applied to first porous layer 11, or second porous layer 12 is laminated on hydrophilic resin composition layer 15. This can provide improved wettability of hydrophilic resin composition layer 15 with first porous layer 11 and second porous layer 12 to improve the unevenness of the film thickness, and the like. The surfactant is not particularly limited, and, for example, conventionally known surfactants such as polyoxyethylene polyoxypropylene glycols, polyoxyethylene alkyl phenyl ethers, polyoxyethylene alkyl ethers, fluorine-based surfactants, and silicone-based surfactants can be used. A single kind of surfactant may be used alone, or greater than or equal to two kinds of surfactants may be used in combination. The hydrophilic resin composition liquid may contain the hydration reaction catalyst for the acidic gas.

(Application Step (S2))

Application step (S2) is the step of applying the hydrophilic resin composition liquid prepared in preparation step (S1) onto first porous layer 11 to form the liquid layer on first porous layer 11. When a leaving step (S2b) of a defoaming step to be described later is performed in a reduced pressure atmosphere, it is preferable to perform application step (S2) after releasing the pressure reduction. When leaving step (S2b) is performed in a heated atmosphere, or when a temperature control step to be described later is included, it is preferable to perform application step (S2) after adjusting the hydrophilic resin composition liquid to be applied to an appropriate viscosity, or adjusting the temperature of the hydrophilic resin composition liquid in order to suppress the occurrence of bubbles due to a gas dissolved in the hydrophilic resin composition liquid. Application step (S2) is preferably performed at a temperature of 15 to 30° C. in an atmospheric pressure.

In application step (S2), for example, as shown in FIG. 3, the hydrophilic resin composition liquid delivered from a defoaming tank 34 is supplied to an application liquid tank 37 including a slot die 38. By providing the inlet/outlet port of the hydrophilic resin composition liquid on the bottom part of application liquid tank 37, the gas in application liquid tank 37 can be prevented from being mixed into the hydrophilic resin composition liquid supplied to slot die 38. The hydrophilic resin composition liquid is continuously applied onto first porous layer 11 continuously unrolled from a first porous layer rolled body 11a in which first porous layer 11 is rolled in a roll from slot die 38, to form the liquid layer. First porous layer rolled body 11a is preferably obtained by rolling first porous layer 11 having a length of greater than or equal to 10 m, and more preferably greater than or equal to an integral multiple of the unit length of the acidic gas separation membrane sheet required for manufacturing one gas separation membrane element.

FIG. 3 shows a method for applying the hydrophilic resin composition liquid using slot die 38. The method for applying the hydrophilic resin composition liquid onto first porous layer 11 is not limited thereto. Examples of the applying method include spin coating, bar coating, die coating, blade coating, air-knife coating, gravure coating, roll coating, spray coating, dip coating, Comma roll method, kiss coater method, screen printing, and inkjet printing. The application amount of the hydrophilic resin composition liquid in a weight per unit area (solid content per unit area) is preferably within a range of 1 $g/m^2$ to 1000 $g/m^2$, more preferably within a range of 5 $g/m^2$ to 750 $g/m^2$, and still more preferably within a range of 10 $g/m^2$ to 500 $g/m^2$. The adjustment of the weight per unit area can be controlled by the application speed of the hydrophilic resin composition liquid (for example, the transport speed of first porous layer 11), the concentration of the hydrophilic resin composition liquid, and the discharge amount of the hydrophilic resin composition liquid and the like. The hydrophilic resin composition liquid may be applied to first porous layer 11 in a stripe pattern or a dot pattern.

The temperature of the hydrophilic resin composition liquid to be applied in application step (S2) may be appropriately determined depending on the composition and the density. An excessively high temperature may, however, evaporate the medium from the liquid layer of the hydrophilic resin composition liquid applied to first porous layer 11 in a large amount, possibly changing the composition and the density, and leaving a mark of evaporation in hydrophilic resin composition layer 15. The temperature is thus preferably higher than or equal to 15° C., and preferably lower than or equal to the boiling point of the medium in use by 5° C. For example, when water is used as the medium, the temperature of the hydrophilic resin composition liquid in application step (S2) is preferably within a range of 15° C. to 95° C., and usually within a temperature range of 15° C. to 30° C.

(Drying Step (S3))

Drying step (S3) is the step of drying the liquid layer to form the applied layer on first porous layer 11. First porous layer 11 on which the liquid layer is formed by applying the hydrophilic resin composition liquid in application step (S2) is transported to a drying furnace 39 shown in FIG. 3, and the medium is removed from the liquid layer on first porous layer 11 to form the applied layer.

A method for removing the medium is not particularly limited, and a method is preferable, in which heated air and the like is allowed to flow to evaporate the medium. for removal, and the liquid layer is dried. Specifically, for example, the inside of drying furnace 39 may be adjusted to a predetermined temperature and a predetermined humidity, and first porous layer 11 having the liquid layer formed thereon is carried into drying furnace 39, to evaporate the medium for removal from the liquid layer on first porous layer 11. In drying step (S3), it is preferable to select drying conditions so that the medium content of the applied layer is suitable when second porous layer 12 is laminated in a lamination step (S4) to be described later.

The drying conditions in drying furnace 39 may be determined depending on the medium content of the applied layer in lamination step (S4), and it is preferable to determine a drying temperature in drying furnace 39 in consideration of the medium contained in the hydrophilic resin composition liquid and the type of first porous layer 11. Usually, the drying temperature is preferably higher than the freezing point of the medium and lower than the melting point of the material constituting first porous layer 11. Normally, the drying temperature is suitably within a range of 60° C. to 200° C. The drying step may be performed in a state where the inside of drying furnace 39 is divided and the sections are set to different temperatures. In this case, the temperatures of the sections of the inlet and outlet portions are preferably lower than the temperature of the section of a central portion.

In the method for manufacturing acidic gas separation membrane sheet 10, application step (S2) and drying step (S3) may be repeated twice or more to form a hydrophilic resin composition layer including greater than or equal to two applied layers. The hydrophilic resin composition layer is composed of greater than or equal to two applied layers, whereby the occurrence of pinholes caused by the unevenness and the like of hydrophilic resin composition layer 15 can be suppressed. When the hydrophilic resin composition layer is formed as greater than or equal to two applied layers, coating conditions such as the composition and application amount of the hydrophilic resin composition liquid, and drying conditions may be different from each other in the applied layers, and may be the same.

(Lamination Step (S4))

Lamination step (S4) is the step of laminating second porous layer 12 on the applied layer formed on first porous layer 11 in drying step (S3) to form laminate body 18. Second porous layer 12 is laminated on a side opposite to first porous layer 11 of the applied layer. In lamination step (S4), for example, as shown in FIG. 3, second porous layer 12 is continuously unrolled from second porous layer rolled body 12a in which second porous layer 12 is rolled in a roll, and second porous layer 12 is laminated on the exposed surface of the applied layer formed on first porous layer 11 to form laminate body 18. Second porous layer rolled body 12a is preferably obtained by rolling second porous layer 12 having a length of greater than or equal to 10 m, and more preferably greater than or equal to an integral multiple of the unit length of the acidic gas separation membrane sheet required for manufacturing one gas separation membrane element.

In lamination step (S4), second porous layer 12 is preferably laminated on the applied layer in the range of an environmental humidity of greater than or equal to 40% RH and less than or equal to 85% RH. The environmental humidity is more preferably greater than or equal to 45% RH, still more preferably greater than or equal to 50% RH, and usually less than or equal to 85% RH. The environmental humidity is greater than or equal to 40% RH, whereby, when second porous layer 12 is laminated on the applied layer, the applied layer and second porous layer 12 can be satisfactorily adhered to each other, which is less likely to cause an adhesion failure portion. Thereby, in acidic gas separation membrane sheet 10, hydrophilic resin composition layer 15 and second porous layer 12 can be bonded with a sufficient adhesive strength, which can suppress the occurrence of the adhesion failure portion.

Following lamination step (S4), the step of rolling laminate body 18 in a roll may be performed to form a laminate-body rolled body 18a.

(Inspection Step)

Inspection step is the step performed between application step (S2) and drying step (S3). In the inspection step, abnormalities such as foreign matters, bubbles, bubble marks and the like present in at least one of a surface of the liquid layer and an inside of the liquid layer of the hydrophilic resin composition liquid applied onto first porous layer 11 are confirmed. In the method for manufacturing acidic gas separation membrane sheet 10, the inspection step may or may not be provided. However, by providing the inspection step, a region having poor separation performance in laminate-body rolled body 18a is likely to be distinguished, whereby, when the gas separation membrane element is manufactured using acidic gas separation membrane sheet 10, acidic gas separation membrane sheet 10 having excellent separation performance is likely to efficiently extracted.

For example, as shown in FIG. 3, the inspection step preferably includes the steps of: imaging the liquid layer formed by applying the hydrophilic resin composition liquid onto first porous layer 11 from slot die 38 (hereinafter, referred to as "imaging step"), detecting an abnormality included in at least one of a surface of the liquid layer and an inside of the liquid layer using an image obtained in the imaging step (hereinafter, referred to as "abnormality detection step"), and providing a mark on at least one of the first porous layer and the second porous layer so as to make it possible to recognize a region including the liquid layer in which the abnormality is detected (hereinafter, referred to as "marking step").

Figure 4:
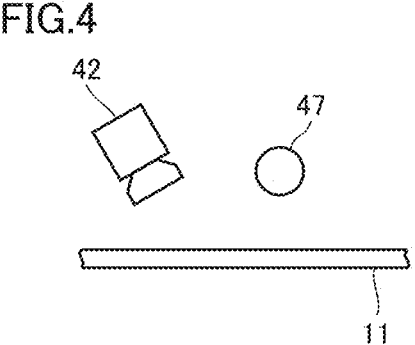
FIG. 4 is a schematic view for illustrating an imaging method in an imaging step of the present invention.

FIG. 4 is a schematic view for illustrating an imaging method in the imaging step. In the imaging step, the liquid layer on first porous layer 11 is imaged using an imaging device 42 such as a camera. For example, as shown in FIG. 4, the imaging step is preferably performed using a light source 47 that radiates visible light and/or infrared light in addition to imaging device 42. Light source 47 is preferably linear illumination arranged in a direction perpendicular to the conveying direction of first porous layer 11.

In the imaging step, as schematically shown in FIG. 4, the visible light and/or the infrared, light radiated from light source 47 are/is radiated to the liquid layer on first porous layer 11. It is preferable that imaging device 42 performs imaging at a position where a specular reflection image of the visible light and/or infrared light radiated from the light source is not incident, to detect reflected light or scattering light caused by the abnormality present in the surface of the liquid layer and/or the inside of the liquid layer. In the above, imaging device 42 performs imaging from one direction, but a plurality of imaging devices may be provided to image the liquid layer on first porous layer 11 from a plurality of directions.

In the abnormality detection step, the abnormality present in at least one of the surface of the liquid layer and the inside of the liquid layer is detected using the image imaged by imaging device 42. The abnormality can be detected by, for example, analyzing the image imaged by imaging device 42 using a binarization processing method in which each pixel is divided into an abnormal part and a normal part based on whether the density value of each pixel is greater than or equal to a preset threshold value, or less than the threshold value.

The marking step provides a mark so as to make it possible to recognize a region including the liquid layer in which the abnormality is detected in the abnormality detection step. In the marking step, it is preferable to provide the mark on the region where the detection amount of the abnormal part detected in the abnormality detection step exceeds the threshold value. The mark provided in the marking step can be provided, for example, on at least one of the first porous layer and the second porous layer in the region including the liquid layer in which the abnormality is detected, and the mark is preferably provided on second porous layer 12 laminated in lamination step (S4).

Figure 5:
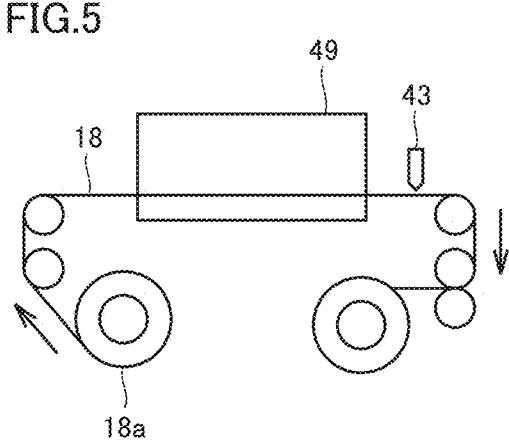
FIG. 5 is a schematic view for illustrating further steps in a manufacturing device for manufacturing an acidic gas separation membrane sheet of the present invention.

For example, in the marking step, the mark may be provided on first porous layer 11 following the abnormality detection step. In drying step (S3), or between drying step (S3) and lamination step (S4), the mark may be provided. The mark may be provided on the first porous layer of laminate body 18 obtained in lamination step (S4). As shown in FIG. 5, when the mark is provided on second porous layer 12 in the marking step, the mark may be provided on second porous layer 12 unrolled to be supplied to the lamination step. The mark may be provided on second porous layer of laminate body 18 obtained in lamination step (S4). The mark can be provided, for example, by applying an ink onto first porous layer 11 and/or second porous layer 12 from a marking head 43 as shown in FIG. 5. When the mark is provided using the marking head 43, for example, in the abnormality detection step, information on the position of the region including the liquid layer in which the abnormality is detected is recorded. By calculating a timing when the region including the liquid layer in which the abnormality is detected passes through the position of marking head 43 based on this information, the mark can be provided on the first porous layer and/or second porous layer of the region including the liquid layer in which the abnormality is detected.

(Removing Step)

In the removing step, the region including the liquid layer in which the abnormality is detected is removed from laminate body 18 based on the mark applied in the marking step. The removing step may include the step of, for example, unrolling laminate body 18 once rolled in a roll, and rolling laminate body 18 from which the region including the liquid layer in which the abnormality is detected is removed, in a roll. The removing step may be performed, for example, when laminate body 18 rolled in a roll is unrolled in the manufacture of the gas separation membrane element using laminate body 18. In this case, acidic gas separation membrane sheet 10 having no abnormality in the manufacture of the gas separation membrane element can be used by removing the region including the liquid layer in which a defect is detected by cutting and the like based on the mark provided in the marking step, whereby the acidic gas separation membrane element having excellent separation performance can be efficiently prepared.

(Other Steps)

The method for manufacturing acidic gas separation membrane sheet 10 may include steps other than the above-described steps. Examples of the other steps provided between preparation step (S1) and application step (S2) include the steps of: adjusting the hydrophilic resin composition liquid to a predetermined temperature (hereinafter, referred to as "temperature control step"); removing bubbles contained in the hydrophilic resin composition liquid (hereinafter, referred to as "defoaming step"); and detecting contaminants such as bubbles and foreign matters mixed in the hydrophilic resin composition liquid (hereinafter, referred to as "liquid inspection step"). Examples of the other steps provided following lamination step (S4) include the step performed in order to further remove the medium in the applied layer formed in drying step (S3) (hereinafter, "additional drying step").

(Defoaming Step)

Defoaming step is performed between preparation step (S1) and application step (S2) in order to remove bubbles contained in the hydrophilic resin composition liquid prepared in preparation step (S1). The defoaming step may or may not be provided in the method for manufacturing acidic gas separation membrane sheet 10, but the defoaming step is preferably provided when the hydrophilic resin composition liquid has a relatively high viscosity. In particular, when the hydrophilic resin composition liquid has a viscosity of greater than or equal to 100 Pa·s at a temperature of 25° C. and a shear rate of $0.1 \text{ s}^{-1}$, the defoaming step is performed to reduce the bubbles being mixed in the liquid layer applied in application step (S2), whereby the occurrence of the abnormalities such as bubble marks and pores in hydrophilic resin composition layer 15 of acidic gas separation membrane sheet 10 can be suppressed. The viscosity of the hydrophilic resin composition liquid at a temperature of 25° C. and a shear rate of 0.1 can be measured by a rheometer (for example, manufactured by TA Instruments Co., Ltd.; trade name: "AR 2000 ex"). This suppresses the abnormalities such as bubble marks and pores occurring in hydrophilic resin composition layer 15 to suppress the occurrence of the adhesion failure portion between hydrophilic resin composition layer 15 and second porous layer 12 even when the viscosity of the hydrophilic resin composition liquid is relatively high, whereby the ratio of the standard deviation of the second peel strength to the average value of the second peel strength (standard deviation/average value) can be reduced.

The defoaming step can include the steps of: applying a shear to the hydrophilic resin composition liquid (hereinafter, referred to as "shear application step"); and leaving the hydrophilic resin composition liquid (hereinafter, referred to as "leaving step"). Shear application step (S2a) and leaving step (S2b) are preferably repeated once or twice or more. It is preferable that leaving step (S2b) is finally performed in the defoaming step. Thereby, the hydrophilic resin composition liquid can be sufficiently defoamed.

Shear application step (S2a) is not particularly limited as long as it is the step of applying a shear to the hydrophilic resin composition liquid, and examples thereof include a stirring step of stirring the hydrophilic resin composition liquid, and a filtration step of causing the hydrophilic resin composition liquid to pass through a filter. Shear application step (S2a) is preferably at least one of the stirring step and the filtration step. In the shear application step, both the stirring step and the filtration step are more preferably performed. In this case, it is preferable that the stirring step is first performed, and the filtration step is then performed.

In shear application step (S2a), for example, as shown in FIG. 3, the stirring step is first performed by stirring the hydrophilic resin composition liquid in stirring tank 32. Thereafter, the hydrophilic resin composition liquid stirred in stirring tank 32 can be caused to pass through a filter 33 to perform the filtration step.

In the stirring step, the viscosity of the hydrophilic resin composition liquid is lowered by stirring the hydrophilic resin composition liquid in stirring tank 32 to apply a shear. This can promote the separation of the bubbles from the hydrophilic resin composition liquid to remove the bubbles. Examples of a stirring device that can be used in the stirring step include a rotor blade type stirrer shown in FIG. 3, a milder, a pressure type homogenizer, a high speed rotary shear type homogenizer, a planetary type stirrer, and a centrifuge. As the shape of the rotor blade, a large blade and an anchor blade that sufficiently stir an gas-liquid interface part and generate flow that does not prevent the bubbles from rising are suitable. The stirring conditions in the stirring step are not particularly limited. It is preferable to perform stirring so that a shear rate is set to 5 to 700 $s^{-1}$, and it is preferable that the hydrophilic resin contained in the hydrophilic resin composition liquid is not broken by shearing.

In the filtration step, the hydrophilic resin composition liquid is caused to pass through filter 33 to apply a shear to the hydrophilic resin composition liquid as in the stirring step to lower the viscosity of the hydrophilic resin composition liquid. This can promotes the separation of the bubbles from the hydrophilic resin composition liquid to remove the bubbles. Examples of filter 33 that can be used in the filtration step include a membrane filter, a depth filter, and a hollow fiber membrane. The filtration conditions in the filtration step are not particularly limited. It is preferable to perform filtration so that a shear rate is set to 5 to 700 $s^{-1}$, and it is preferable to adjust the opening and filtration area of the filter, and a flow volume depending on a pressure loss in the filtration step. In the filtration step, examples of a method for feeding the hydrophilic resin composition liquid to filter 33 include pressure feeding by pressurizing stirring tank 32, and discharge using a pump. The pump is preferably a rotary type pump, and examples thereof include a gear pump, a rotary pump, and a mono pump.

Leaving step (S2b) is not particularly limited as long as the hydrophilic resin composition liquid can be left to remove the bubbles. For example, as shown in FIG. 3, leaving step (S2b) can include the steps of: leaving the hydrophilic resin composition liquid stirred in the stirring step in stirring tank 32 (hereinafter, referred to as "leaving step-1"); and leaving the hydrophilic resin composition liquid that has passed through filter 33 in the filtration step performed following leaving step-1 in defoaming tank 34 (hereinafter, referred to as "leaving step-2"). Leaving step (S2b) is preferably performed under at least one of a reduced pressure atmosphere and a heated atmosphere, and more preferably performed under a reduced pressure atmosphere, from the viewpoint of the efficiency of removal of the bubbles.

The pressure under the reduced pressure atmosphere is preferably greater than or equal to 1.01 times of the vapor pressure of the medium contained in the hydrophilic resin composition liquid, more preferably greater than or equal to 1.05 times, and usually less than or equal to 2 times. By setting the above-described pressure range, the boiling of the hydrophilic resin composition liquid during the pressure reduction can be suppressed.

The temperature in the heated atmosphere is not particularly limited as long as the temperature is higher than or equal to the temperature of the hydrophilic resin composition liquid in the shear application step, and the medium contained in the hydrophilic resin composition liquid does not boil. The temperature of the heated atmosphere is preferably higher than or equal to 25° C., and preferably higher than or equal to 30° C. The temperature is preferably lower than 90° C., and more preferably lower than or equal to 85° C. An atmosphere heated so that a temperature during heating in a temperature control step to be described later is maintained also in leaving step (S2b) is also included in the heated atmosphere.

When leaving step (S2b) is performed under a reduced pressure atmosphere, for example, as shown in FIG. 3, the pressure of stirring tank 32 and defoaming tank 34 is reduced using the pressure reducing pump or the vacuum pump and the like, which makes it possible to perform the leaving step under an atmosphere reduced the pressure. Thereby, the bubbles contained in the hydrophilic resin composition liquid can be efficiently removed.

When leaving step (S2b) is performed under the heated atmosphere, by using a heating device such as a heat medium flow jacket, a resistance heating device, an induction heating device, or a microwave irradiation device provided in stirring tank 32 or defoaming tank 34, the hydrophilic resin composition liquid stored in stirring tank 32 and defoaming tank 34 may be heated. As a result, the viscosity of the hydrophilic resin composition liquid is reduced, whereby the bubbles are likely to be removed.

As described above, when leaving step (S2b) includes leaving step-1 and leaving step-2, both leaving step-1 and leaving step-2 may be performed in the reduced pressure atmosphere or the heated atmosphere, or may be performed in different atmospheres. Leaving step-1 may be omitted, the filtration step may be performed following the stirring step, but it is preferable that leaving step-2 is not omitted.

(Temperature Control Step)

Temperature control step is performed to adjust the hydrophilic resin composition liquid to a predetermined temperature before shear application step (S2a). Thereby, the defoaming efficiency of the hydrophilic resin composition liquid in shear application step (S2a) or leaving step (S2b) can be improved. The predetermined temperature is not particularly limited as long as the medium contained in the hydrophilic resin composition liquid does not boil, but it is preferably higher than the temperature of the hydrophilic resin composition liquid in application step (S2). For example, the temperature is preferably lower than 90° C., more preferably lower than or equal to 85° C., still more preferably lower than or equal to 80° C., and usually higher than or equal to 25° C. The temperature control step can be performed, for example, by stirring tank 32 shown in FIG. 3.

During shear application step (S2*a*) and leaving step (S2*b*), the hydrophilic resin composition liquid is preferably maintained at the predetermined temperature adjusted in the temperature control step. Therefore, in order to keep the temperature of the temperature-controlled hydrophilic resin composition liquid at a constant level as much as possible, stirring tank 32, filter 33, defoaming tank 34, and a pipe for feeding the hydrophilic resin composition liquid from stirring tank 32 to defoaming tank 34 preferably include a heat medium flow jacket and a heat insulating material and the like.

(Liquid Inspection Step)

Liquid inspection step is the step of detecting contaminants such as bubbles and foreign substances mixed in the hydrophilic resin composition liquid. The liquid inspection step is preferably performed between preparation step (S1) and application step (S2), or between the defoaming step and application step (S2) when the defoaming step is performed. The liquid inspection step can be performed, for example, for the hydrophilic resin composition liquid flowing in a pipe 35 shown in FIG. 3, and preferably includes the steps of: imaging the hydrophilic resin composition liquid delivered from defoaming tank 34 by the pump and the like to flow in the pipe 35 (hereinafter, referred to as "liquid imaging step"); and detecting contaminants mixed in the hydrophilic resin composition liquid (hereinafter, referred to as "contaminant detection step"). Furthermore, as shown in FIG. 3, the liquid inspection step preferably includes the step of controlling the supply of the hydrophilic resin composition liquid flowing in pipe 35 to an application liquid tank 37 based on the detection results of the contaminants in the contaminant detection step (hereinafter, referred to as "supply control step").

In the liquid imaging step, the hydrophilic resin composition liquid flowing in pipe 35 is imaged using a liquid imaging device 41. In the contaminant detection step, the contaminants can be detected by analyzing the image obtained in the imaging step using image analysis software and the like. In the supply control step, the supply of the hydrophilic resin composition liquid to application step (S2) is controlled depending on the detection results of the contaminants in the contaminant detection step. Specifically, it is preferable that, by switching a valve 36 provided in the pipe, the hydrophilic resin composition liquid in which the detected amount of the contaminants in the contaminant detection step is less than or equal to the threshold value is supplied to application step (S2), and the hydrophilic resin composition liquid in which the detected amount exceeds the threshold value is not supplied to application step (S2). The hydrophilic resin composition liquid that has not been supplied to application step (S2) may be recovered, for example, in a recovery tank (not shown), and supplied to stirring tank 32 shown in FIG. 3. The hydrophilic resin composition liquid may be directly supplied to stirring tank 32 without passing through the recovery tank. The hydrophilic resin composition liquid supplied to stirring tank 32 can be used to form hydrophilic resin composition layer 15 by performing the defoaming step and the like. Thus, by performing the liquid inspection step, application step (S2) can be performed using the hydrophilic resin composition liquid containing few contaminants such as bubbles and foreign matters, whereby acidic gas separation membrane sheet 10 is likely to be manufactured at a high yield.

(Additional Drying Step)

In the additional drying step, for example, as shown in FIG. 5, laminate body 18 can be continuously unrolled from laminate body rolled body 18*a*, and conveyed to an additional drying furnace 49 to further remove the medium from the applied layer. As the additional drying furnace 49, the same one as the drying furnace 39 can be used, and the drying temperature when additional drying is performed may be appropriately determined depending on the medium contained in the hydrophilic resin composition liquid, and the types of first porous layer 11 and second porous layer 12. Usually, the temperature is preferably higher than the freezing point of the medium and lower than the melting point of a material forming first porous layer 11 and second porous layer 12. In general, the temperature is suitably within a range of 60° C. to 200° C. Laminate body 18 conveyed out of the additional drying furnace 49 can be rerolled in a roll.

The case where the rolling step of rolling laminate body 18 in a roll is provided following lamination step (S4) has been described above as an example, but laminate body 18 may be conveyed to the additional drying furnace without performing the step of rolling laminate body 18 to perform additional drying.

(Gas separation Membrane Element)

Acidic gas separation membrane sheet 10 can be used for known gas separation membrane elements such as spiral-wound type, flat-membrane type, pleated type, and plate-and-frame type gas separation membrane elements.

Figure 7:
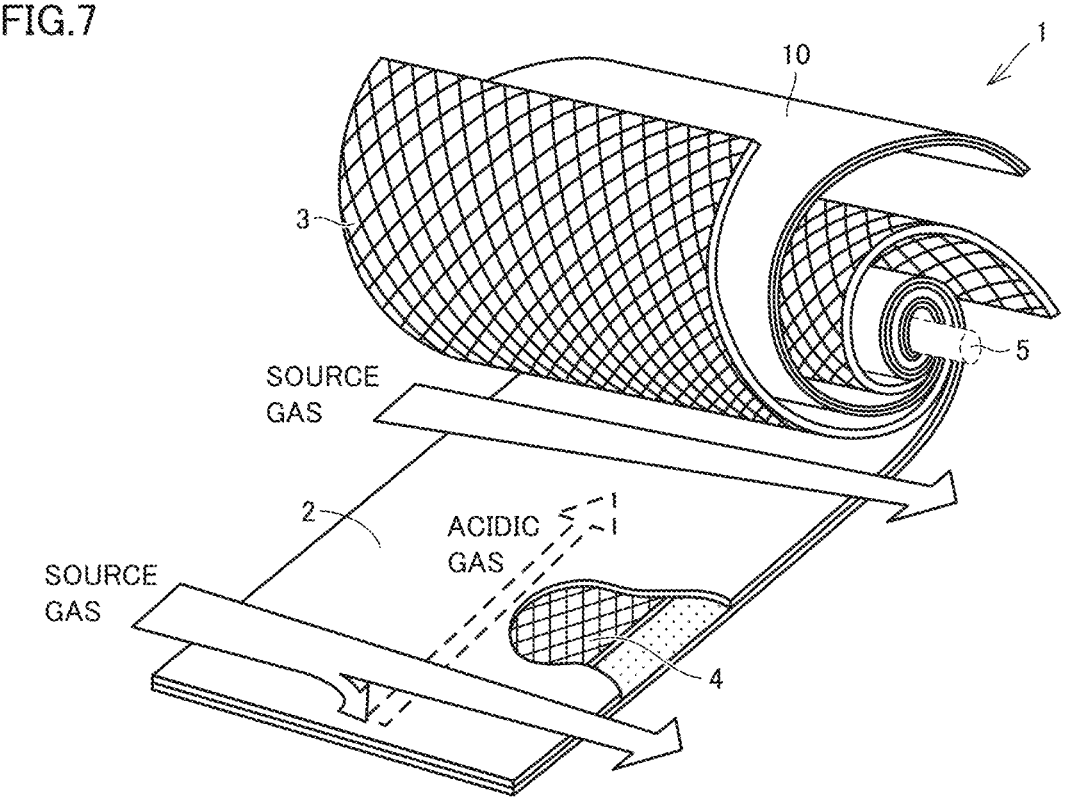
FIG. 7 is a schematic perspective view showing a developed gas separation membrane element, in which a partially cutout portion is provided.
Figure 8:
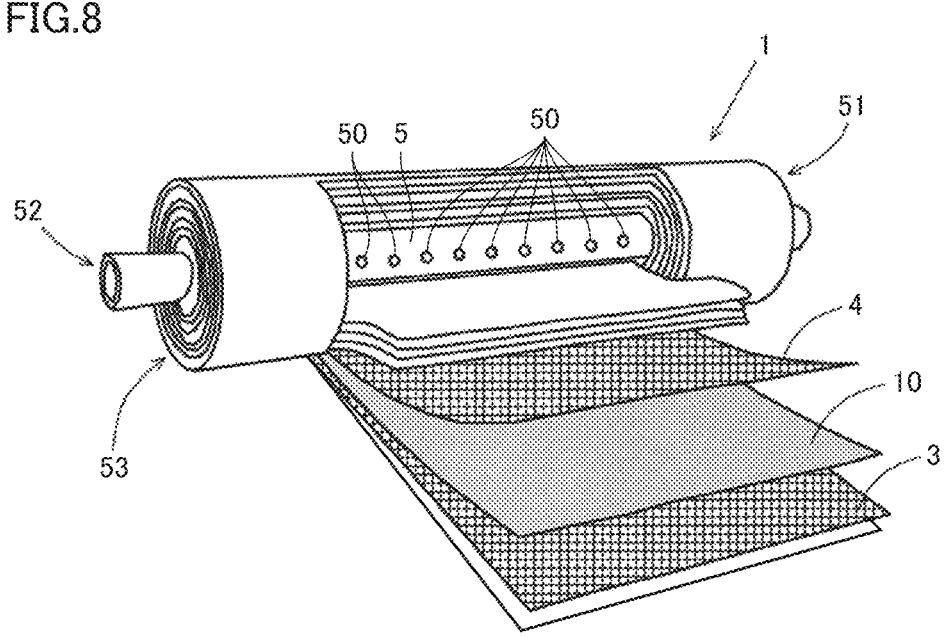
FIG. 8 is a schematic perspective view showing a gas separation membrane element, in which a partially developed portion is provided.

The case of using the spiral-wound type gas separation membrane element as the gas separation membrane element will be described as an example. FIG. 7 is a schematic perspective view showing a developed spiral-wound type gas separation membrane element, in which a partially cutout portion is provided. FIG. 8 is a schematic perspective view showing gas separation membrane element 1, in which a partially developed portion is provided.

Spiral-wound type gas separation membrane element 1 may include a feed-side flow path member 3 in which a source gas containing an acidic gas flows, an acidic gas separation membrane sheet 10 that selectively separates the acidic gas contained in the source gas flowing in feed-side flow path member 3 to cause the acidic gas to permeate therethrough, a permeate-side flow path member 4 in which the permeate gas containing the acidic gas that has permeated through acidic gas separation membrane sheet 10 flows, a sealing part for preventing the mixing of the source gas with the permeate gas, and a central tube 5 for collecting the permeate gas flowing in permeate-side flow path member 4. The spiral-wound type gas separation membrane element may include a wound body which includes central tube 5 and an element stack body rolled around central tube 5. In the element stack body, at least one feed-side flow path member 3, at least one gas separation membrane 2, and at least one permeate-side flow path member 4 are stacked. The wound body may have any shape such as a cylindrical shape or a rectangular cylindrical shape.

Gas separation membrane element 1 may further include a fixing member (not shown) such as an outer peripheral tape or an anti-telescope device in order to prevent the wound body from rerolling or the collapse of rolling. In order to secure a strength against a load due to internal pressure and external pressure on gas separation membrane element 1, an outer wrap (reinforcing layer) may be provided on the outermost periphery of the wound body.

Feed-side flow path member 3 and permeate-side flow path member 4 preferably have a function of promoting the turbulent flows (surface renewal of the membrane surface)

of the source gas and permeate gas that has permeated through acidic gas separation membrane sheet 10 to increase the membrane permeation rate of the permeate gas in the source gas, and a function of reducing the pressure losses of the source gas to be fed and permeate gas that has permeated through acidic gas separation membrane sheet 10 as much as possible. Feed-side flow path member 3 and permeate-side flow path member 4 preferably have a function as a spacer for forming a flow path for the source gas and the permeate gas, and a function of generating turbulent flow in the source gas and the permeate gas, whereby those having a network shape (net shape, mesh shape, and the like) are suitably used. Depending on the network shape, the flow path for the gas changes. Therefore, the shape of the unit cell of the network is preferably selected according to the purpose, for example, from shapes such as a square, a rectangle, a rhombus, and a parallelogram. Materials of feed-side flow path member 3 and permeate-side flow path member 4 are not particularly limited. The materials preferably have heat resistance capable of enduring the operating temperature conditions of gas separation device in which gas separation membrane element 1 is provided.

A sealing part is provided to prevent the mixing of the source gas with the permeate gas. For example, a sealing material penetrates into permeate-side flow path member 4 and acidic gas separation membrane sheet 10, and is cured, whereby the sealing part can be formed. The sealing part can be generally provided at end parts located at both ends in a direction parallel to the axis of central tube 5 of the wound body, and at the end part in which a distance between central tube 5 and the end part is long among end parts located at both ends in a direction orthogonal to the axis of central tube 5 so as to have a so-called envelope shape. A material generally used as an adhesive agent can be used for the sealing part. For example, an epoxy resin and the like can be used.

Central tube 5 is a conduit for collecting the permeate gas that has permeated through acidic gas separation membrane sheet 10 and discharging the same from gas separation membrane element 1. Central tube 5 is preferably made of a material that has heat resistance capable of enduring the operating temperature conditions of gas separation device in which gas separation membrane element 1 is provided and a mechanical strength capable of enduring the rolling of the element stack body. As shown in FIG. 8, central tube 5 has a plurality of holes 30 in the outer peripheral surface of central tube 5. Holes 30 communicate between the flow path space for the permeate gas formed by permeate-side flow path member 4 and an inner hollow space of central tube 5.

Gas separation membrane element 1 can be used for a gas separation membrane module, and the gas separation membrane module includes one or more gas separation membrane elements 1. The gas separation membrane module includes a source gas supply port (portion communicating with a feed-side end part 51 shown in. FIG. 8) for feeding the source gas to the acidic gas separation membrane sheet, a permeate gas discharge port (portion communicating with a discharge port 52 shown in FIG. 8) for discharging the permeate gas that has permeated through the acidic gas separation membrane sheet, and a retentate gas discharge port (a portion communicating with a discharge-side end part 53 shown in FIG. 8) for discharging the source gas that has not permeated through the acidic gas separation membrane sheet. The source gas supply port, the retentate gas discharge port, and the permeate gas discharge port may be provided in the main body of the gas separation membrane element, or provided in a container for storing the gas separation membrane element (hereinafter, referred to as "housing").

The housing can form a space for sealing the source gas flowing in the separation membrane module. The housing may include, for example, a cylindrical member made of stainless steel and the like, and a blocking member for blocking both the axial ends of the cylindrical member. The housing may have any shape such as a cylindrical shape or a rectangular cylindrical shape. However, gas separation membrane element 1 preferably has a cylindrical shape since gas separation membrane element 1 usually has a cylindrical shape. A partition can be provided in the housing to prevent the mixing of the source gas fed to feed-side end part 51 with the retentate gas that has not permeate through acidic gas separation membrane sheet 10 provided in gas separation membrane element 1.

When greater than or equal to two gas separation membrane elements 1 are disposed in the housing, the source gases fed to respective gas separation membrane elements 1 may be fed in parallel or in series. Here, feeding source gases in parallel means that at least the source gases are distributed and introduced into a plurality of gas separation membrane elements. Feeding source gases in series means that at least a permeate gas and/or a retentate gas discharged from upstream gas separation membrane element 1 are/is introduced into downstream gas separation membrane element 1.

EXAMPLES

Hereinafter, the present invention will be more specifically described with reference to Examples and Comparative Examples; however, the present invention is not intended to be limited thereto.

[Measurement of Contact Angle]

The contact angle of water in a second porous layer used in each of Examples and Comparative Examples was measured at 25° C. using a contact angle meter (manufactured by Kyowa Interface Science Co., Ltd.; trade name: "DropMaster 500").

[Measurement of Viscosity]

The viscosity of a hydrophilic resin composition liquid used in each of Examples and Comparative Examples at a temperature of 25° C. and a shear rate of $0.1\ s^{-1}$ was measured by a rheometer (manufactured by TA Instruments Co., Ltd.; trade name: "AR 2000 ex"),

[Method for Calculating Average Value of Second Peel Strength and Ratio of Standard Deviation of Second Peel Strength to Average Value]

The average value of the second peel strength and the ratio of the standard deviation of the second peel strength to the average value of the second peel strength (standard deviation/average value) were obtained from the average value and standard deviation of the peel strength for 5 seconds to 15 seconds after the start of the measurement of the time-lapse data of the peel strength using a peel tester (manufactured by Aikoh Engineering Co., Ltd.; trade name: embossed carrier tape peel tester "MODEL-2165P". A specific method for measuring the time-lapse data of the peel strength is as follows.

1) From an acidic gas separation membrane sheet 10, a 25 mm×100 mm sample for measurement is cut out.

2) The sample for measurement is left for 2 hours in an environment of a temperature of 25° C. and a humidity 50% RH.

3) A resin flat plate is pasted on the surface of acidic gas separation membrane sheet 10 of the sample for measurement on which a first porous layer 11 is exposed, with a double-sided tape.
4) A second porous layer 12 on the end part of acidic gas separation membrane sheet 10 is slightly peeled off to make a grip margin.
5) The sample for measurement is fixed on a sample fixing clip of the peel tester.
6) The grip margin of the sample for measurement is fixed on a tip clip of the peel tester
7) The time-lapse data of the peel strength is measured under the conditions of a peel angle of 180 degrees and a peel speed of 300 mm/min.

When a hydrophilic resin composition layer 15 was present on the surface on the side of first porous layer 11 during the measurement of the peel strength, the second peel strength was determined to be less than the first peel strength.

[Gas Leakage Test]

(Preparation of Gas Separation Membrane Element)

A gas separation membrane element was prepared as follows using the acidic gas separation membrane sheet obtained in each of Examples and Comparative Examples. Materials used for preparing the gas separation membrane element are as follows.

The details of members used for preparing the gas separation membrane element in Examples 1 to 4 and Comparative Examples 1 and 2 are as follows.

Feed-side flow path member:

One PPS net layer (50×50 mesh) (manufactured by DIO CHEMICALS, LTD; trade name: 50-150 PPS)

Permeate-side flow path member:

Three PPS net layers (50×50 mesh/60×40 mesh/50×50 mesh) (manufactured by DIO CHEMICALS, LTD.; trade names: 50-150 PPS and 60(40)-150 PPS)

Central tube:

A central tube having an outer diameter of 1 inch and made of stainless steel, in which a total of 20 holes each having a diameter of 3 mm are formed in the outer wall of the central tube. The holes are formed in two rows in a direction parallel to the axis of the central tube, and 10 holes are formed per row at a pitch of 25.4 mm so as to form a uniform spacing over a range in a direction parallel to the axis of the central tube around which the laminate body is wound. Two rows are provided at opposing positions across the axis of the central tube.

The acidic gas separation membrane sheet obtained in each of Examples and Comparative Examples was cut into a quadrilateral shape excluding a region including a liquid layer in which an abnormality was detected based on a mark applied in a marking step to be described later. The acidic gas separation membrane sheet was folded in two with the side of the second porous layer being placed inside, and the feed-side flow path member was sandwiched to obtain a membrane leaf. One end of a first permeate-side flow path member was fixed to the central tube. The membrane leaf (first membrane leaf) obtained above was stacked on the permeate-side flow path member so that it was separated from central tube.

Subsequently, a second permeate-side flow path member was stacked on the first membrane leaf. An epoxy-based adhesive (manufactured by Alemco Products, Inc.; trade name: 2310) was applied onto the second permeate-side flow path member corresponding to both end parts of the first membrane leaf in a direction parallel to the axis of the central tube, and an end part far from the central tube among end parts located at both ends of the first membrane leaf in a direction orthogonal to the axis of the central tube. Thereafter, a second membrane leaf was stacked in the same manner as described above, and a third permeate-side flow path member was further stacked to obtain a membrane leaf stack body. The second membrane leaf was stacked so that the second membrane leaf was separated from the central tube as compared with the second permeate-side flow path member.

An adhesive was applied onto an uppermost third layer permeate-side now passage member of the obtained membrane leaf stack body in the same manner as above, and the membrane leaf stack body was then wound around the central tube to form a spiral body. A heat-resistant tape was rolled around the outer periphery, and both end parts of the spiral body were then cut. An anti-telescope device was attached to the cut surface, and an outer wrap (reinforcement layer) was formed of a fiber reinforced resin to obtain a gas separation membrane element.

(Gas Leakage Test)

Figure 9:
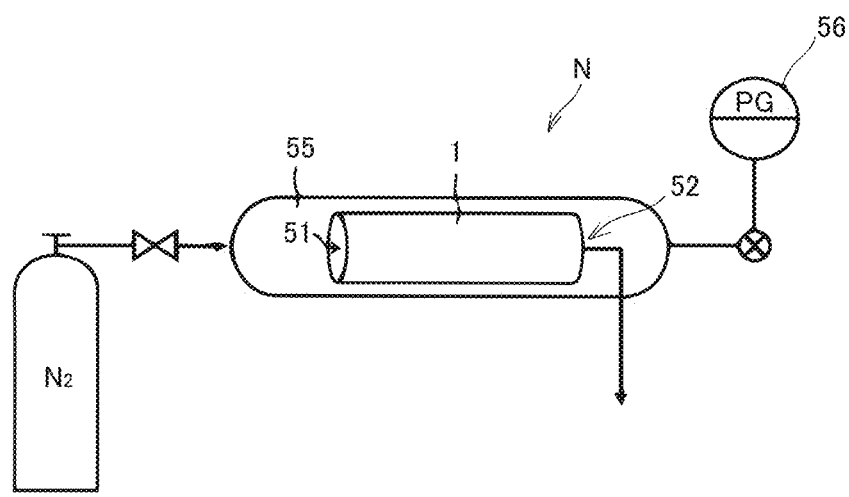
FIG. 9 is a schematic side view illustrating a test device for performing a gas leakage test of a gas separation membrane element.

As shown in FIG. 9, a gas separation membrane element 1 was fixed in a stainless-steel housing 55 of a testing device N so that the side of a feed-side end part 51 of gas separation membrane element 1 and the side of a discharge port 52 of the central tube were separated from each other by an acidic gas separation membrane sheet 10 of gas separation membrane element 1. The central tube was extended to the outside of housing 55 on the side of discharge port 52, and was closed on the opposite side. Feed-side end part 51 and discharge-side end part 53 in gas separation membrane element 1 were opened in housing 55. That is, a gas fed to housing 55 was caused to flow into gas separation membrane element 1 from feed-side end part 51 and discharge-side end part 53 of gas separation membrane element 1.

A cylinder for feeding nitrogen ($N_2$) gas into housing 55 was attached via a valve, and a pressure gauge 56 for measuring a pressure in housing 55 was attached. $N_2$ gas having room temperature (20° C.) was fed into housing 55, and a pressure of 1500 kPaG (G indicates a gauge pressure) was applied to the side of feed-side end part 51 of gas separation membrane element 1. The pressure was confirmed by the pressure gauge 56. Meanwhile, the pressure on the side of discharge port 52 of the central tube was adjusted to atmospheric pressure.

A gas leakage test of gas separation membrane element 1 was performed by measuring the time change of the pressure in housing 55 with pressure gauge 56 while the above state was maintained, to evaluate the $N_2$ gas permeation performance of gas separation membrane element 1. Specifically, the permeance ($mol/(m^2 \cdot s \cdot kPa)$) of $N_2$ was calculated based on the time change of the measured pressure, and the permeance of less than $1 \times 10^{-9}$ $mol/(m^2 \cdot s \cdot kPa)$ was determined to be the best. The permeance of greater than or equal to $1 \times 10^{-9}$ $mol/(m^2 \cdot s \cdot kPa)$ and less than $5 \times 10^{-9}$ $mol/(m^2 \cdot s \cdot kPa)$ was determined to be good. The permeance of greater than or equal to $5 \times 10^{-9}$ $mol/(m^2 \cdot s \cdot kPa)$ was determined to be poor.

Example 1

Preparation Step 161.38 parts by mass of water as a medium, 4 parts by mass of crosslinked polyacrylic acid (manufactured by SUMITOMO SEIKA CHEMICALS CO., LTD.; trade name: AQUPEC "HV-501") as a hydrophilic resin, and 0.8 parts by mass of non-crosslinked polyacrylic acid (manufactured by SUMITOMO SEIKA CHEMICALS CO., LTD.: trade name:

AQUPAANA "AP-40F (40% Na Saponified)" were charged into a raw material tank 31 to obtain a dispersion liquid in which the hydrophilic resin was dispersed in the water. After 38.09 parts by mass of a 50% aqueous solution of cesium hydroxide was added to the dispersion liquid, followed by mixing, 1.2 parts by mass of a 10% surfactant (manufactured by AGC Seimi Chemical Co., Ltd.; trade name: Surflon "S-242") aqueous solution was added as an additive, followed by mixing to obtain a hydrophilic resin composition liquid. The viscosity of the obtained hydrophilic resin composition liquid was measured. The results are shown in Table 1.

(Defoaming Step-1)

As shown in FIG. 3, the hydrophilic resin composition liquid obtained in the preparation step was transferred from a raw material tank 31 to a stirring tank 32 including a rotor blade type stirrer, and the hydrophilic resin composition liquid was heated to a temperature of 30±1° C. in stirring tank 32 (temperature control step). Thereafter, in stirring tank 32, the temperature was maintained at 30±1° C., and stirring was performed for 4 hours (stirring step). The details and stirring conditions of stirring tank 32 are as follows.

Volume of stirring tank: 1 m$^3$
Diameter of stirring tank: 1.0 m
Blade diameter of rotor blade: 0.8 m
Blade shape of rotor blade: anchor blade
Number of rotations of blade: 20 rpm
Shear rate: 8 s$^{-1}$ Subsequently, after the stirring was stopped, the pressure in stirring tank 32 was reduced to 4.6 kPaA (A indicates an absolute pressure), and the temperature was maintained at 30±1° C., and the hydrophilic resin composition liquid was left for 18 hours (leaving step-1).

(Defoaming Step-2)

After leaving step-1, the pressure in stirring tank 32 was restored to the atmospheric pressure while the temperature was maintained at 30±1° C. As shown in FIG. 3, the hydrophilic resin composition liquid was delivered from stirring tank 32 to cause the hydrophilic resin composition liquid to pass through filter 33 (filtration step), and introduced into a defoaming tank 34. The details and filtration conditions of the filter are as follows.

Filter: PP depth filter (opening: 50 μm) (manufactured by Roki Techno Co., Ltd.; trade name: Slope Pure Filter Cartridge "SHP-500")
Flow volume: 0.12 m$^3$/h
Filtration area: 0.18 m$^2$
Shear rate: 30 s$^{-1}$ Subsequently, the pressure of defoaming tank 34 into which the hydrophilic resin composition liquid was introduced was reduced to 4.6 kPaA (A indicates an absolute pressure). The temperature was maintained at 30±1° C., and the hydrophilic resin composition liquid was left for 20 hours (leaving step-2).

(Application Step)

As a first porous layer 11, a hydrophobic porous PTFE membrane (manufactured by Sumitomo Electric Fine Polymer Inc.; trade name: POREFLON "HP-010-50") was used, and the hydrophilic resin composition liquid obtained above was applied onto one surface of first porous layer 11 unrolled from a first porous layer rolled body 11a at a temperature of 20 to 25° C. to form a liquid layer.

(Inspection Step)

Using an imaging device (manufactured by NAGASE & CO., LTD.; trade name: line sensor camera "XCM6040SAT2V1-F-N", light source (manufactured by HAYASHI-REPIC CO., LTD.; trade name: narrow line LED illumination (white) 1200 mm long), the liquid layer formed in the application step was imaged (imaging step). The obtained image was binarized and analyzed using an image analysis device (manufactured by NAGASE & CO., LTD.; trade name: SCANTEC "8000") to detect an abnormality in the surface of the liquid layer and the inside of the liquid layer (abnormality detection step) to acquire Information on the position of the detected abnormality.

(Drying Step)

Following the inspection step, first porous layer 11 onto which the hydrophilic resin composition liquid was applied was transported to drying furnace 39, and dried at a temperature of about 120° C., for about 20 minutes to form an applied layer.

(Lamination Step)

Subsequently, a second porous layer 12 unrolled from a second porous layer rolled body 12a was laminated in a room in which an environmental humidity was adjusted to a range of 60% RH to 65% RH, to form a laminate body 18. The laminate body 18 was rolled in a roll. As second porous layer 12, the same hydrophobic PTFE porous membrane as that used for first porous layer 11 was used. When the contact angle of water in second porous layer 12 was measured using the above-described method, the contact angle was 125 degrees at a temperature of 25° C.

(Additional Drying Step)

As shown in FIG. 5, laminate body 18 rolled in a roll was unrolled, conveyed to additional drying furnace 49, and dried at a temperature of about 120° C. for about 20 minutes. Subsequently, a mark was provided on second porous layer 12 so as to make it possible to recognize the region including the liquid layer in which the abnormality was detected based on the information acquired in the abnormality detection step (marking step), and laminate body 18 was rolled in a roll.

A gas separation membrane element was prepared using the obtained laminate body 18 according to the above-described preparation procedure, to perform a gas leakage test. When the gas separation membrane element was prepared, a sample for measurement for the peel strength of the acidic gas separation membrane sheet was collected. From the measurement results of the peel strength of the sample for measurement, the average value of the second peel strength and the ratio of the standard deviation of the second peel strength to the average value (standard deviation/the average value) was calculated. The results are shown in Table 1.

Example 2

An acidic gas separation membrane sheet was obtained in the same manner as in Example 1 except that an environmental humidity in a lamination step was set to be within a range of 80% RH to 85% RH. The peel strength of the obtained acidic gas separation membrane sheet was measured, and the average value of the second peel strength, and the ratio of the standard deviation of the second peel strength to the average value (standard deviation/average value) was calculated. A gas leakage test was performed using the obtained acidic gas separation membrane sheet. The results are shown in Table 1.

Example 3

An acidic gas separation membrane sheet was obtained in the same manner as in Example 1 except that an environmental humidity in a lamination step was set to be within a range of 40% RH to 45% RH and an inspection step (an abnormality detection step and a marking step) was not performed. The peel strength of the obtained acidic gas separation membrane sheet was measured, and the average value of the second peel strength, and the ratio of the standard deviation of the second peel strength to the average value (standard deviation/average value) was calculated. A gas leakage test was performed using the obtained acidic gas separation membrane sheet. The results are shown in Table 1.

Comparative Example 1

An acidic gas separation membrane sheet was obtained in the same manner as in Example 1, except that a defoaming step-1, a defoaming step-2, and an inspection step (an abnormality detection step and a marking step) were not performed. The peel strength of the obtained acidic gas separation membrane sheet was measured, and the average value of the second peel strength, and the ratio of the standard deviation of the second peel strength to the average value (standard deviation/average value) was calculated. A gas leakage test was performed using the obtained acidic gas separation membrane sheet. The results are shown in Table 1.

Comparative Example 2

An acidic gas separation membrane sheet was obtained in the same manner as in Example 1 except that an environmental humidity in a lamination step was set to be within a range of 30% RH to 35% RH. The peel strength of the obtained acidic gas separation membrane sheet was measured, and the average value of the second peel strength, and the ratio of the standard deviation of the second peel strength to the average value (standard deviation/average value) was calculated. A gas leakage test was performed using the obtained acidic gas separation membrane sheet. The results are shown in Table 1.

In all of Examples 1 to 3 and Comparative Examples 1 and 2, the second peel strength was determined to be less than the first peel strength since hydrophilic resin composition layer 15 is present on the surface on the side of first porous layer 11 during the measurement of the peel strength.

tube, 10: acidic gas separation membrane sheet, 11: first porous layer, 11a: first porous layer rolled body, 12: second porous layer, 12a: second porous layer rolled body, 15: hydrophilic resin composition layer, 18: laminate body, 18a: laminate-body rolled body, 31: raw material tank, 32: stirring tank, 33: filter, 34: defoaming tank, 35: pipe, 36: valve, 37: application liquid tank, 38: slot die, 39: drying furnace, 41: liquid imaging device, 42: imaging device, 43: marking head, 47: light source, 49: additional drying furnace, 90: acidic gas separation membrane sheet, 50: hole, 51: feed-side end part, 52: discharge port, 53: discharge-side end part, 55: housing, 56: pressure gauge, 91: first porous layer, 92: second porous layer, 95: hydrophilic resin composition layer

The invention claimed is:

1. An acidic gas separation membrane sheet that causes an acidic gas to selectively permeate therethrough, comprising:
    a first porous layer, a hydrophilic resin composition layer, and a second porous layer in this order,
    wherein:
    a second peel strength between the second porous layer and the hydrophilic resin composition layer is less than a first peel strength between the first porous layer and the hydrophilic resin composition layer,
    an average value of the second peel strength is within a range of greater than or equal to 98 N/m and less than or equal to 500 N/m,
    the average value of the second peel strength is a value obtained by leaving a 25 mm×100 mm sample that has been cut out of the acidic gas separation membrane sheet in an environment of a temperature of 25° C. and a humidity of 50% RH for at least 2 hours, attaching the sample to a peel tester, and averaging values of peel strength for 5 seconds to 15 seconds after the start of the measurement for time-lapse data of the peel strength measured under the condition of a peel angle of 180 degrees and a peel speed of 300 mm/min, and
    wherein a ratio of a standard deviation of the second peel strength to the average value of the second peel strength (standard deviation/average value) is less than 0.5, and the ratio of a standard deviation of the second peel strength to the average value of the second peel strength is obtained at the same condition for obtaining the average value of the second peel strength.

TABLE 1

| | Hydrophilic resin composition liquid Viscosity [Pa · s] | Acidic gas separation membrane sheet | | | | | | | Gas separation membrane element |
|---|---|---|---|---|---|---|---|---|---|
| | | Second porous layer | | | Second peel strength | | | | |
| | | Material | Contact angle [°] | Humidity in lamination step [% RH] | Average value [N/m] | Standard deviation/ average value | Defoaming step | Inspection step | Gas leakage test |
| Example 1 | 160 | PTFE | 125 | 60-65 | 27 | 0.08 | Presence | Presence | Best |
| Example 2 | 160 | PTFE | 125 | 80-85 | 98 | 0.03 | Presence | Presence | Best |
| Example 3 | 160 | PTFE | 125 | 40-45 | 9.4 | 0.66 | Presence | Absence | Good |
| Comparative Example 1 | 160 | PTFE | 125 | 60-65 | 2.8 | 0.53 | Absence | Absence | Poor |
| Comparative Example 2 | 160 | PTFE | 125 | 30-35 | 1.8 | 0.09 | Presence | Presence | Poor |

REFERENCE SIGNS LIST

1: gas separation membrane element, 3: feed-side flow path member, 4: permeate-side flow path member, 5: central 2. The acidic gas separation membrane sheet according to claim 1, wherein a contact angle of water in the second porous layer is greater than or equal to 90 degrees at a temperature of 25° C.

3. The acidic gas separation membrane sheet according to claim 1, wherein the second porous layer contains at least one resin selected from the group consisting of polyethylene, polypropylene, polystyrene, polyethylene terephthalate, fluorine-containing resin, polyethersulfone, polyphenylene sulfide, polysulfone, polyimide, polyetherimide, and polyetheretherketone.

4. The acidic gas separation membrane sheet according to claim 1, wherein the hydrophilic resin composition layer contains a hydrophilic resin, a substance that reversibly reacts with an acidic gas, and a medium.

5. An acidic gas separation membrane element comprising the acidic gas separation membrane sheet according to claim 1.

6. The acidic gas separation membrane element according to claim 5, further comprising:
a perforated central tube; and
an element stack body including the acidic gas separation membrane sheet,
wherein the element stack body is wound around the perforated central tube.

7. A gas separation membrane module comprising:
at least one acidic gas separation membrane element according to claim 5;
a source gas supply port for feeding a source gas to the acidic gas separation membrane sheet;
a retentate gas discharge port for discharging a source gas that does not permeate through the acidic gas separation membrane sheet; and
a permeate gas discharge port for discharging an acidic gas that has permeated through the acidic gas separation membrane sheet.

8. A method for manufacturing the acidic gas separation membrane sheet according to claim 1, the method comprising the steps of:
preparing the hydrophilic resin composition liquid for forming the hydrophilic resin composition layer;
applying the hydrophilic resin composition liquid onto the first porous layer to form a liquid layer;
drying the liquid layer to form an applied layer on the first porous layer; and
laminating the second porous layer on the applied layer to form a laminate body,
wherein the hydrophilic resin composition liquid contains a hydrophilic resin and a medium.

9. The method according to claim 8, wherein the hydrophilic resin composition liquid further contains a substance that reversibly reacts with an acidic gas.

10. The method according to claim 8, further comprising the step of drying the applied layer in the laminate body following the step of laminating the second porous layer on the applied layer.

11. The method according to claim 8, further comprising a step of confirming an abnormality of the liquid layer between the step of applying the hydrophilic resin composition liquid onto the first porous layer and the step of drying the liquid layer to form an applied layer on the first porous layer,
wherein the step of confirming the abnormality includes the steps of:
imaging the liquid layer;
detecting an abnormality included in at least one of a surface of the liquid layer and an inside of the liquid layer using an image obtained in the imaging step;
providing a mark on at least one of the first porous layer and the second porous layer so as to make it possible to recognize a region including the liquid layer in which the abnormality is detected; and
removing the region based on the mark provided in the step of providing the mark.

12. A method for manufacturing an acidic gas separation membrane element including an acidic gas separation membrane sheet, wherein the acidic gas separation membrane sheet is manufactured by the method for manufacturing an acidic gas separation membrane sheet according to claim 11.

13. The method according to claim 8, further comprising a step of removing bubbles contained in the hydrophilic resin composition liquid between the step of preparing the hydrophilic resin composition liquid and the step of applying the hydrophilic resin composition liquid onto the first porous layer.

* * * * *